(No Model.) W. E. HATTON. 2 Sheets—Sheet 1.
BEE HIVE.
No. 293,873. Patented Feb. 19, 1884.
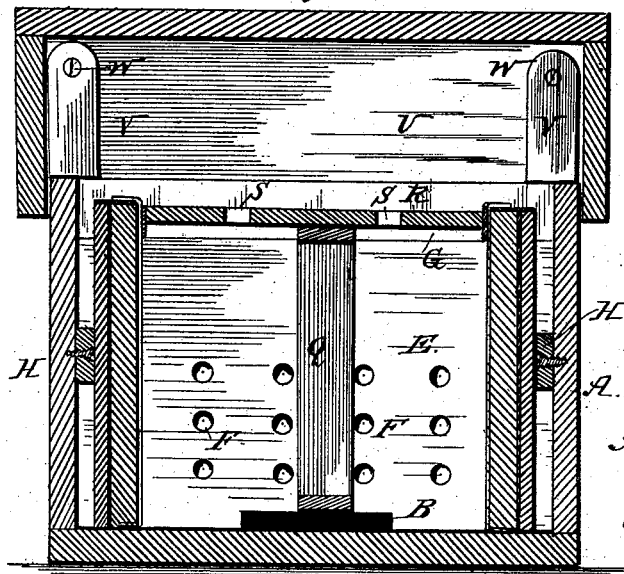
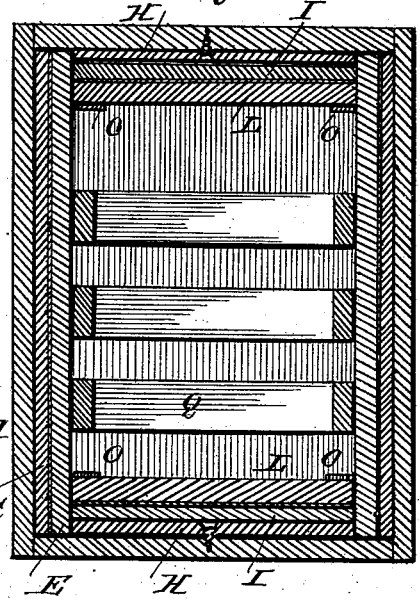
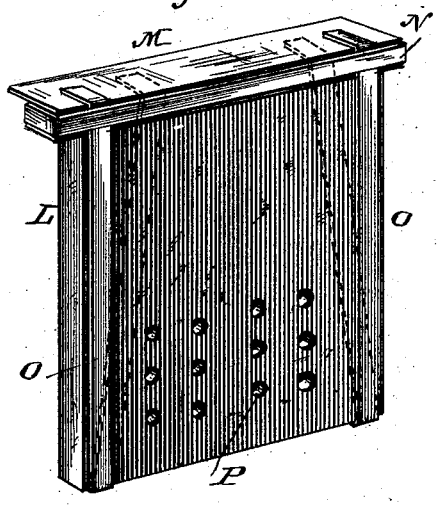
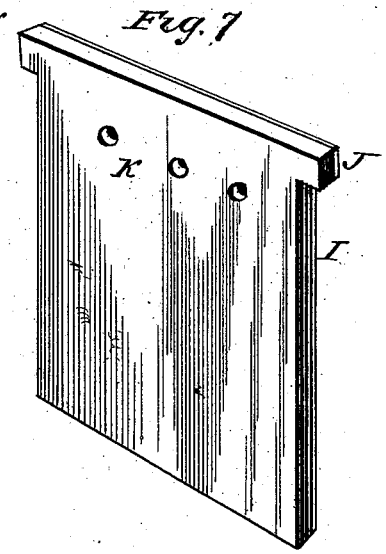
WITNESSES:
Fred. G. Dieterich.
Wm. Locher.
INVENTOR.
William E. Hatton
By Louis Bagger & Co.
ATTORNEYS.

(No Model.) 2 Sheets—Sheet 2.
W. E. HATTON.
BEE HIVE.
No. 293,873. Patented Feb. 19, 1884.
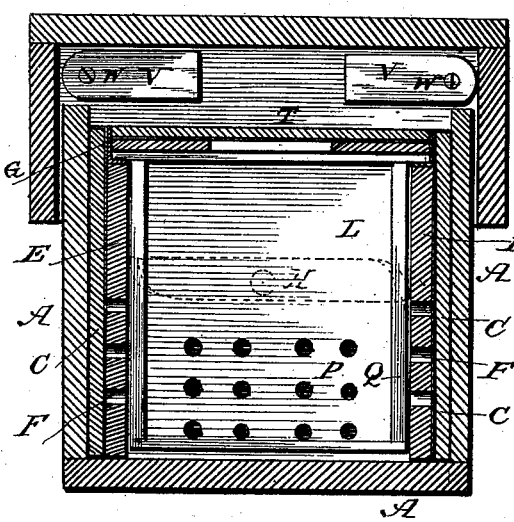
Fig. 2.
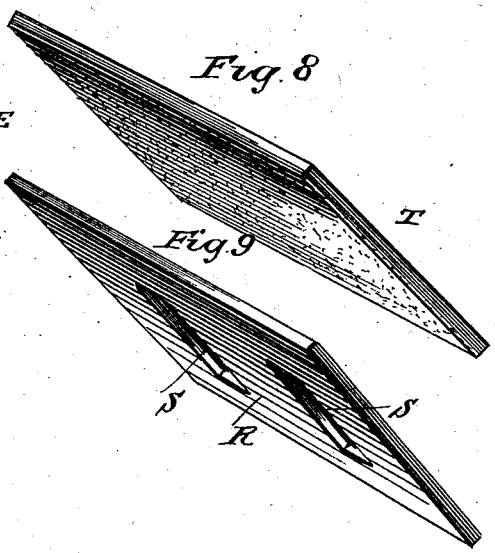
Fig. 8.
Fig. 9.
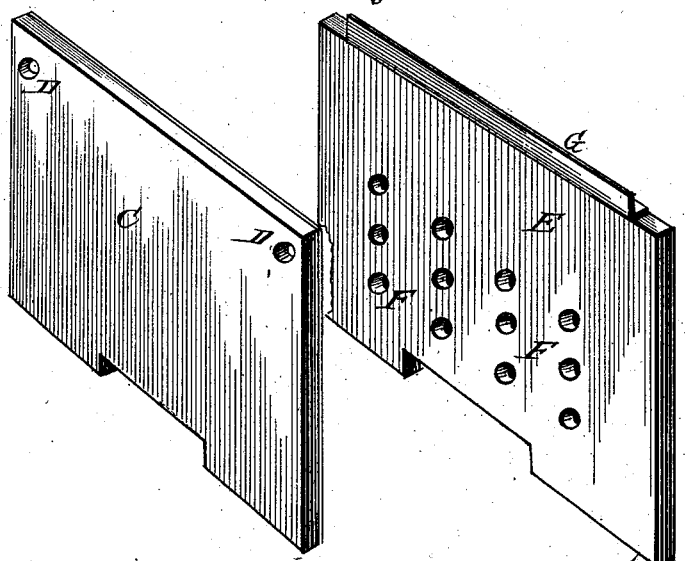
Fig. 4. Fig. 5.
WITNESSES:
Fred. G. Dieterich
Wm. Kocher
William E. Hatton
INVENTOR.
By Louis Bagger & Co.,
ATTORNEYS.

UNITED STATES PATENT OFFICE.

WILLIAM E. HATTON, OF CLARKSBURG, INDIANA.

BEE-HIVE.

SPECIFICATION forming part of Letters Patent No. 293,873, dated February 19, 1884.

Application filed July 19, 1883. (No model.)

*To all whom it may concern:*

Be it known that I, WILLIAM E. HATTON, of Clarksburg, in the county of Decatur and State of Indiana, have invented certain new and useful Improvements in Bee-Hives; and I do hereby declare that the following is a full, clear, and exact description of the invention, which will enable others skilled in the art to which it appertains to make and use the same, reference being had to the accompanying drawings, which form a part of this specification, and in which—

Figure 1 is a longitudinal vertical sectional view of my improved bee-hive. Fig. 3 is a vertical cross-section of the same. Fig. 3 is a horizontal section; and Figs. 4, 5, 6, 7, 8, and 9 are detail views of the removable side, end, and top pieces.

Similar letters of reference indicate corresponding parts in all the figures.

My invention has relation to bee-hives; and it consists in the improved construction and combination of parts of a hive which is provided with removable perforated side, end, and top pieces covered with an absorbent and non-conducting material, protected from contact with the contents of the hive by removable perforated top, side, and end pieces, whereby the hive may be made impenetrable by cold or dampness during the winter, and a perfect ventilation kept up in the hive, the impure air passing out through the perforations in the removable side and end pieces, while their lining will keep the heat generated by the bees from escaping, as hereinafter more fully described and claimed.

In the accompanying drawings, the letter A indicates a rectangular casing, having the usual entrance-hole, B, near the bottom, which latter extends slightly beyond the lower edge of the side piece, forming a foot-board for the bees entering or leaving the hive. On the inner sides of the casing are placed two boards, C, of the same size as the inside of the side piece, covered upon one side with felt, cloth, or other absorbent non-conducting textile material, and having perforations D at their upper edges, on the inner side of which boards or lined side pieces are placed two boards or side pieces, E, having three (more or less) rows of perforations, F, at their lower ends, and having strips, G, of sheet metal bent longitudinally at a right angle, and forming rabbets upon their upper edges. These side pieces are held in place by means of two cleats, H, pivoted at their middle, in the center of the end pieces of the casing, upon two screws, and bearing with their rounded ends against the inner side of the ends of the side pieces, pressing them against the side pieces of the casing, when the cleats are in their horizontal position, while the side pieces may be released by turning the cleats out of the said position. Inside the end pieces of the casing are placed two plates or end pieces, I, having two lugs, J, projecting laterally from the upper corners, resting upon the upper edges of the inner removable side pieces, and having a series of perforations, K, in their upper ends, and covered with cloth, felt, or other absorbent and non-conducting material upon one side. Two similarly-shaped inner end pieces, L, are placed inside the lined end pieces, and are provided upon their side and top edges with cloth or felt strips M, the top strip of which extends over the top edge of the lined end piece, resting loosely upon the same when the pieces are in position; and to prevent the beeswax from coming in contact with the said strips, the inside of the top edge of each of the end pieces is covered with a strip, N, of sheet metal, while two other strips, O, of sheet metal are loosely attached at their lower ends to the lower edge of the end piece, and project with their bent ends under the top strips, so that they may have an inward lateral play, serving to break the wax away from the corners formed by the inner end and side pieces, when it is desired to remove them. The lower ends of the inner end pieces are provided with three (more or less) rows of perforations, P, serving to admit air into the hive and to permit the vitiated air in the same to escape.

The comb-frames Q are placed in the space formed inside the inner side and end pieces, resting with the projecting ends of their top pieces in the rabbets formed by the metal strips upon the upper edges of the inner side pieces. The top of the space formed by the inner side and end pieces is covered by a board or top piece, R, fitting into the rabbets in the upper edges of the inner side pieces with its side edges, and bearing with its ends against the top strips upon the inner end pieces; and the said top piece has two or more transverse slots or apertures, S, through which the bees may pass into the upper compartment of the hive, which will be described later, and a plate, T, covered upon side with absorbent and non-conducting material, may be placed over the inner top piece during winter, covering the apertures in the latter piece.

The upper compartment, U, in which the honey-frames are placed, which latter may be of any desirable construction, fits with its open lower end over the top of the casing, and four cleats, V, are pivoted at their ends upon screws W at the ends of the side pieces of the upper casing or compartment, at the upper corners of the same, so that by turning them to point downward with their lower ends the said ends will rest upon the upper edges of the casing, raising the upper compartment above the said edges, and forming room for the honey-frames, while by turning the cleats in a horizontal position, with their sides resting upon the upper edges of the lower casing, the upper compartment will fit down over the sides of the hive proper, only forming an air-space above the hive or lower casing. In the summer, when the bees are working, the upper compartment or honey-chamber is raised, the lining of the outer side pieces and end pieces turned outward, and the lined top piece removed, when the air will enter the hive at the entrance-hole and pass out through the perforations in the inner side and end pieces, from the latter into the space between the inner and outer side and end pieces, and out through the perforations in the upper ends of the outer pieces between the sides of the lower casing and the upper compartment.

When the hive is to be turned into winter-quarters for the bees, the upper compartment and the top piece is removed, the loosely-pivoted strips upon the inner end pieces moved inward, breaking the wax formed in the corners loose, when the outer side and end pieces may be removed and turned, placing the lined side inward, the lined top piece placed over the inner top piece, and the empty honey-compartment placed over the top of the casing, with the sides of its cleats resting upon the upper edges of the same, thus only admitting of a small quantity of air escaping, keeping the warm air in the hive, with the vitiated air escaping through the apertures in the lower portion of the inner side and end pieces into the lining of the outer pieces, from which the air escapes through the apertures in their tops into the space formed by the lowered honey-compartment.

Having thus described my invention, I claim and desire to secure by Letters Patent of the United States—

1. A bee-hive provided with the removable perforated side, end, and top pieces covered with an absorbent and non-conducting material, and side pieces having metallic strips upon their exposed edges, as and for the purpose shown and set forth.

2. The combination, in a bee-hive, of the outer casing having a removable top, removable side, end, and top pieces lined with an absorbent and non-conducting material, and the removable perforated inner side, end, and top pieces, the said lined pieces being interposed between the sides, ends, and top of the outer casing and the removable inner perforated pieces, as and for the purpose shown and set forth.

3. The combination of the casing having removable top, removable lined outer side pieces having perforations at their upper edges, inner side pieces having perforations at their lower ends and metallic strips at their upper edges, forming rabbets, removable outer end pieces having laterally-projecting lugs at their upper corners and perforations at their upper ends, inner end pieces perforated at their lower ends, having laterally-projecting lugs at their upper corners, lined edges, metallic strips upon the inner side of the upper edges, and pivoted strips at the side edges, transversely-slotted inner top piece, and lined outer removable top piece, as and for the purpose shown and set forth.

4. The herein-described bee-hive, consisting of the rectangular casing having the entrance-hole at the bottom, the lined perforated removable outer side pieces, the inner perforated removable side pieces having metallic strips or rabbets at their upper edges, the outer perforated lined end pieces having lugs at their upper corners, the inner perforated end pieces having strips of metal and textile fabric and lugs at their upper corners, the slotted inner top piece, the lined removable top piece, the comb-frames having projecting top pieces resting in the rabbets in the upper edges of the inner side pieces, and the honey-box fitting over the top of the casing, and having the cleats pivoted at their upper ends in the upper corners of the box, all constructed, arranged, and combined as and for the purpose shown and set forth.

In testimony that I claim the foregoing as my own I have hereunto affixed my signature in presence of two witnesses.

WILLIAM E. HATTON.

Witnesses:
   FREEMAN ROMINGER,
   DAVID F. HITE.